United States Patent [19]

Hashimoto et al.

[11] Patent Number: 4,593,356

[45] Date of Patent: * Jun. 3, 1986

[54] ELECTRONIC TRANSLATOR FOR SPECIFYING A SENTENCE WITH AT LEAST ONE KEY WORD

[75] Inventors: Shintaro Hashimoto, Ikoma; Masafumi Morimoto, Yamatokoriyama; Kunio Yoshida, Nara; Hisao Morinaga, Shiki; Tosaku Nakanishi, Nara; Shigenobu Yanagiuchi, Tenri, all of Japan

[73] Assignee: Sharp Kabushiki Kaisha, Osaka, Japan

[ * ] Notice: The portion of the term of this patent subsequent to Oct. 25, 2000 has been disclaimed.

[21] Appl. No.: 283,961

[22] Filed: Jul. 16, 1981

[30] Foreign Application Priority Data

Jul. 23, 1980 [JP] Japan ................... 55-102997

[51] Int. Cl.[4] ............................. G06F 15/38
[52] U.S. Cl. ................... 364/419; 364/900; 434/157
[58] Field of Search .......... 364/200, 900, 419; 434/167, 157, 169, 176

[56] References Cited

U.S. PATENT DOCUMENTS 4,117,542  9/1978  Klausner et al. .............. 364/900
4,159,536  6/1979  Kehoe et al. .................. 364/900
4,328,562  5/1982  Hashimoto et al. ............ 364/900
4,339,806  7/1982  Yoshida ........................ 364/900
4,412,305 10/1983  Yoshida ........................ 364/900

FOREIGN PATENT DOCUMENTS 2014765  2/1978  United Kingdom ........... 364/900

OTHER PUBLICATIONS

"Language Translator" Advertisement by JS & A Products, Scientific American, Feb. 1979, pp. 4-5.

Primary Examiner—Michael R. Fleming
Attorney, Agent, or Firm—Birch, Stewart, Kolasch & Birch

[57] ABSTRACT

An electronic translator is featured where a particular sentence is accessed from a memory depending on at least one key word entered. The key word is contained in the particular sentence. A subject category may be selected from a plurality of subject categories and only sentences within the selected category may be searched. The translator comprises an input circuit for entering the key word, and subject category an access means for accessing the key word from the subject category within memory so as to specify and access the sentence, and a detection circuit for detecting whether the key word is accessed from the subject category within memory.

10 Claims, 18 Drawing Figures

| L\H | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | A | B | C | D | E | F | G | H | I | J | K | L | M | N | O | P |
| 1 | Q | R | S | T | U | V | W | X | Y | Z |  |  |  |  |  |  |
| 2 | AN | BA | BE | BO | BU | CA | CH | CK | CL | COM | CON | CO | DA | DE | DI | DO |
| 3 | EN | EX | FA | FE | FI | FO | FUL | GE | GH | GO | HA | HE | HI | HO | IN | KE |
| 4 | KI | LA | LE | LI | LO | LY | MA | ME | MI | MO | MU | ND | NE | NG | NI | NO |
| 5 | NT | ON | PA | PE | PI | PO | PU | RA | RE | RI | RO | SA | SE | SH | SI | SO |
| 6 | ST | SU | TA | TE | TH | TI | TO | TU | TY | UN | VE | VI | WA | WE | WI | WO |
| 7 | 0 | 1 | 2 | 3 | 4 | 5 | 6 | 7 | 8 | 9 | $ | CO | C1 | C2 | C3 | C4 |
| 8 |  |  |  |  |  |  |  |  |  |  |  |  |  |  |  |  |
| 9 |  |  |  |  |  |  |  |  |  |  |  |  |  |  |  |  |
| A |  |  |  |  |  |  |  |  |  |  |  |  |  |  |  |  |
| B |  |  |  |  |  |  |  |  |  |  |  |  |  |  |  |  |
| C |  |  |  |  |  |  |  |  |  |  |  |  |  |  |  |  |
| D |  |  |  |  |  |  |  |  |  |  |  |  |  |  |  |  |
| E |  |  |  |  |  |  |  |  |  |  |  |  |  |  |  |  |
| F |  |  |  |  |  |  |  |  |  |  |  |  |  |  |  | C5 |

FIG. 6

| 8 | 7 | 6 | 5 | 4 | 3 | 2 | 1 | BIT |
|---|---|---|---|---|---|---|---|---|
| 1 | | | | A | | | | |
| 1 | | | | N | | | | |
| 0 | | | | AN | | | | |
| 1 | | | | B | | | | |
| 1 | | | | A | | | | |
| 0 | | | | BA | | | | |
| 1 | | | | B | | | | |
| 1 | | | | E | | | | |
| 0 | | | | BE | | | | |
| 1 | | | | B | | | | |
| 1 | | | | O | | | | |
| 0 | | | | BO | | | | |
| 1 | | | | B | | | | |
| 1 | | | | U | | | | |
| 0 | | | | BU | | | | |
| 1 | | | | C | | | | |
| 1 | | | | A | | | | |
| 0 | | | | CA | | | | |
| 1 | | | | C | | | | |
| 1 | | | | H | | | | |
| 0 | | | | CH | | | | |
| 1 | | | | C | | | | |
| 1 | | | | K | | | | |
| 0 | | | | CK | | | | |
| 1 | | | | C | | | | |
| 1 | | | | L | | | | |
| 0 | | | | CL | | | | |
| 1 | | | | C | | | | |
| 1 | | | | O | | | | |
| 1 | | | | M | | | | |
| 0 | | | | COM | | | | |
| 1 | | | | C | | | | |
| 1 | | | | O | | | | |
| 1 | | | | N | | | | |
| 0 | | | | CON | | | | |
| 1 | | | | C | | | | |

| | |
|---|---|
| 1 | T |
| 1 | H |
| 0 | TH |
| 1 | T |
| 1 | I |
| 0 | TI |
| 1 | T |
| 1 | O |
| 0 | TO |
| 1 | T |
| 1 | U |
| 0 | TU |
| 1 | T |
| 1 | Y |
| 0 | TY |
| 1 | U |
| 1 | N |
| 0 | UN |
| 1 | V |
| 1 | E |
| 0 | VE |
| 1 | V |
| 1 | I |
| 0 | VI |
| 1 | W |
| 1 | A |
| 0 | WA |
| 1 | W |
| 1 | E |
| 0 | WE |
| 1 | W |
| 1 | I |
| 0 | WI |
| 1 | W |
| 1 | O |
| 0 | WO |
| 1 1 1 1 1 1 1 1 | ←$c_6$ |

FIG. 7

| | |
|---|---|
| 1 | W |
| 0 | H |
| 0 | EN |
| 1 | SH |
| 0 | O |
| 0 | U |
| 0 | L |
| 0 | D |
| 1 | I |
| 1 1 1 1 0 1 0 | ← $C_{11}$ |
| 0 | CH |
| 0 | E |
| 0 | CK |
| 1 1 1 1 1 0 1 0 | ← $C_{11}$ |
| 0 | IN |
| 1 1 1 1 1 1 0 0 | ← $C_8$ |

WHEN SHOULD I (CHECK IN)?

FIG. 8(b)

| | |
|---|---|
| 1 1 1 1 1 0 1 1 | ← $C_{12}$ |
| 0 | ト |
| 0 | ウ |
| 0 | キョ |
| 0 | ウ |
| 1 | ユ |
| 0 | キ |
| 0 | ノ |
| 1 | キ |
| 0 | ッ |
| 0 | プ |
| 1 | が |
| 1 1 1 1 0 1 0 | ← $C_{11}$ |
| 0 | 2 |
| 1 | マ |
| 0 | イ |
| 1 | ホ |
| 0 | シ |
| 0 | イ |
| 1 1 1 1 1 1 0 | ← $C_7$ |

| | | | | | | | | |
|---|---|---|---|---|---|---|---|---|
| 1 | 1 | 1 | 1 | 1 | 0 | 1 | 0 | } $C_{11}$ |
| 0 | ミ | | | | | | | |
| 0 | ル | | | | | | | |
| 0 | ク | | | | | | | |
| 1 | ヲ | | | | | | | |
| 0 | モ | | | | | | | |
| 0 | ウ | | | | | | | } (ミルク)ヲ モウスコシ クダサイ. |
| 0 | ス | | | | | | | |
| 0 | コ | | | | | | | |
| 0 | シ | | | | | | | |
| 1 | ク | | | | | | | |
| 0 | ダ" | | | | | | | |
| 0 | サ | | | | | | | |
| 0 | イ | | | | | | | |
| 1 | 1 | 1 | 1 | 1 | 1 | 1 | 0 | } $C_7$ |

FIG. 8(d)

ELECTRONIC TRANSLATOR FOR SPECIFYING A SENTENCE WITH AT LEAST ONE KEY WORD

BACKGROUND OF THE INVENTION

The present invention relates in general to a word information storage and retrieval device and, more particularly, to an electronic translator for providing efficient and rapid retrieval of any desired word or words stored therein.

Recently, a new type of electronic devices called an electronic translator has been available on the market. The electronic translator differs from conventional electronic devices in that the former is of a unique structure which provides for efficient and rapid retrieval of word information stored in memory.

In such a translator, rapid retrieval of any word or sentence is assured by a very short access time to a memory storing a great number of words or sentences. Therefore, it is desirable to provide as short an access time as possible.

SUMMARY OF THE INVENTION

Accordingly, it is an object of the present invention to provide an improved electronic translator having a very short access time to a memory storing a great number of sentences.

It is another object of the present invention to provide an improved electronic translator for retrieving information representative of any sentence from a memory storing a great number of sentences, the retrieval being enabled by referring to at least one key word contained in the sentence.

Briefly described, in accordance with the present invention, an electronic translator is featured in that a particular sentence is accessed from a memory, depending on at least one key word inputted. The key word is contained in the particular sentence. The translator comprises an input circuit for entering the key word, an access means for accessing the keyword from the memory so as to specify and access the sentence, a detection circuit for detecting whether the key word is accessed from the memory.

BRIEF DESCRIPTION OF THE DRAWINGS

The present invention will become more fully understood from the detailed description given hereinbelow and accompanying drawings which are given by way of illustration only, and thus are not limitative of the present invention and where:

FIG. 6 shows a table representing letters, compression codes, and control codes used in the word data region WA of FIG. 5;

FIG. 7 shows a detailed format of a compression table in the format of FIG. 4(a);

DESCRIPTION OF THE INVENTION

First, any language can be applied to the electronic translator of the present invention. An input word is spelled in a first specific or source language to obtain an equivalent word, or a translated word spelled in a different target language corresponding thereto. The languages can be freely selected.

Figure 1:
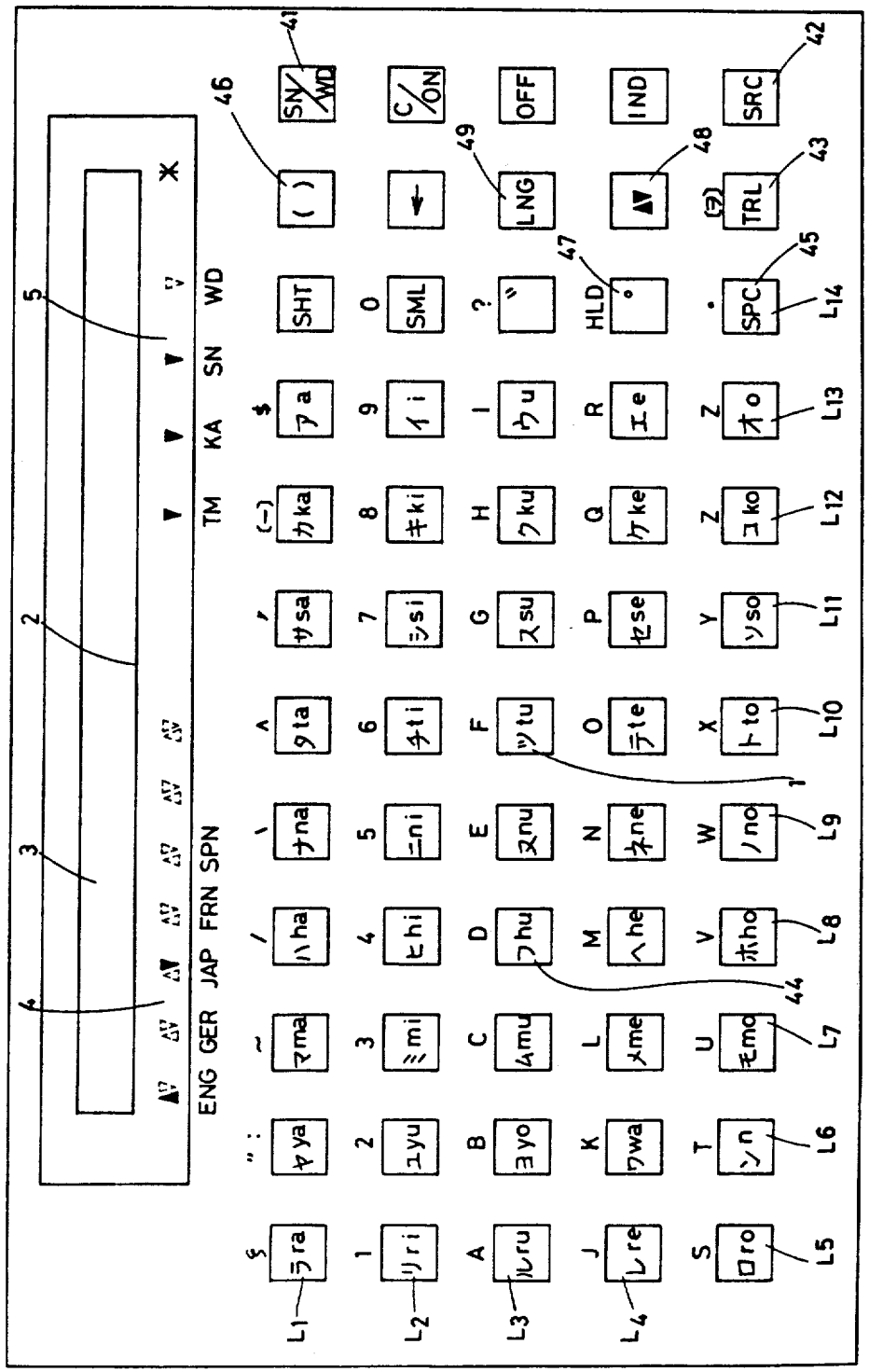
FIG. 1 shows a plan view of an electronic translator according to the present invention.

Referring now to FIG. 1, there is illustrated an electronic translator according to the present invention. The translator comprises a keyboard 1 containing a Japanese syllabary keyboard, an alphabetical keyboard, a symbol keyboard, a function keyboard, an indicator 2 including a character indicator 3, a kind of tongue or language indicator 4 and a symbol indicator 5.

The character indicator 3 displays characters processed by the translator. The kind of tongue or language indicator 4 displays symbols used for representing the kind of the mother tongue or source language and the foreign tongue or target language processed by the translator. The symbol indicator 5 shows symbols used for indicating operation conditions in the translator.

Figure 2:
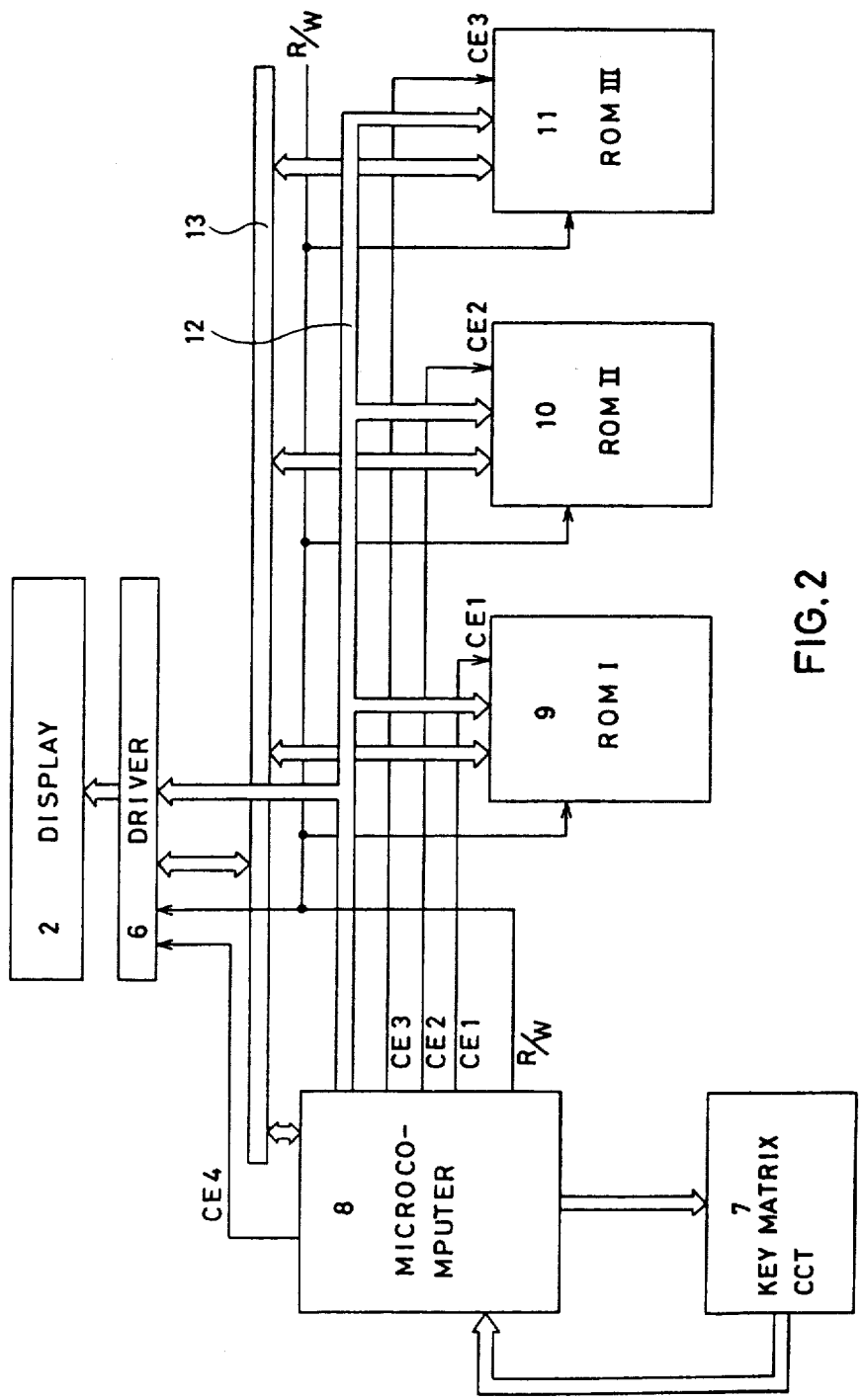
FIGS. 2, 3(a) and 3(b) show block diagrams of a control circuit implemented within the translator as shown in FIG. 1.

FIG. 2 shows a block diagram of a control circuit implemented in the translator. The circuit comprises the indicator 2, a driver 6, a key matrix circuit 7, a microcomputer 8, a ROM I 9, a ROM II 10, and ROM III 11. The circuit 7 functions with the keyboard 1 of FIG. 1. The circuit 7 is connected to terminals of the microcomputer 8 for developing key strobe signals and key input signals. Each of the ROMs 9 to 11 contain words and/or sentences used by the translator.

According to a preferable example of the present invention, each of the ROMs 9 to 11 corresponds to one kind of language. For example, the ROM I 9 stores a plurality of English words, the ROM II 10 stores a number of Japanese words and the ROM III 11 stores a number of German words. Preferably, the ROM I 9 is built in the translator so that it can not be removed from the translator for exchange purposes. However, each of the ROM II 10 and the ROM III 11 can be removed from the translator and replaced by another type of ROM as module ① or ②.

Each of the ROMs 9 to 11 is connected to the microcomuputer 8 through an address bus 12 and a data bus 13. Chip selection signals $CE_1$, $CE_2$ and $CE_3$ are developed by the microcomputer 8 to select one of the ROMs 9 to 11. Words and/or sentences are applied to the microcomputer 8 from the selected ROM. $CE_4$ indicates a chip selection signal for the driver 6. R/W indicates a read/write signal for selecting read or write operation.

Figure 3:
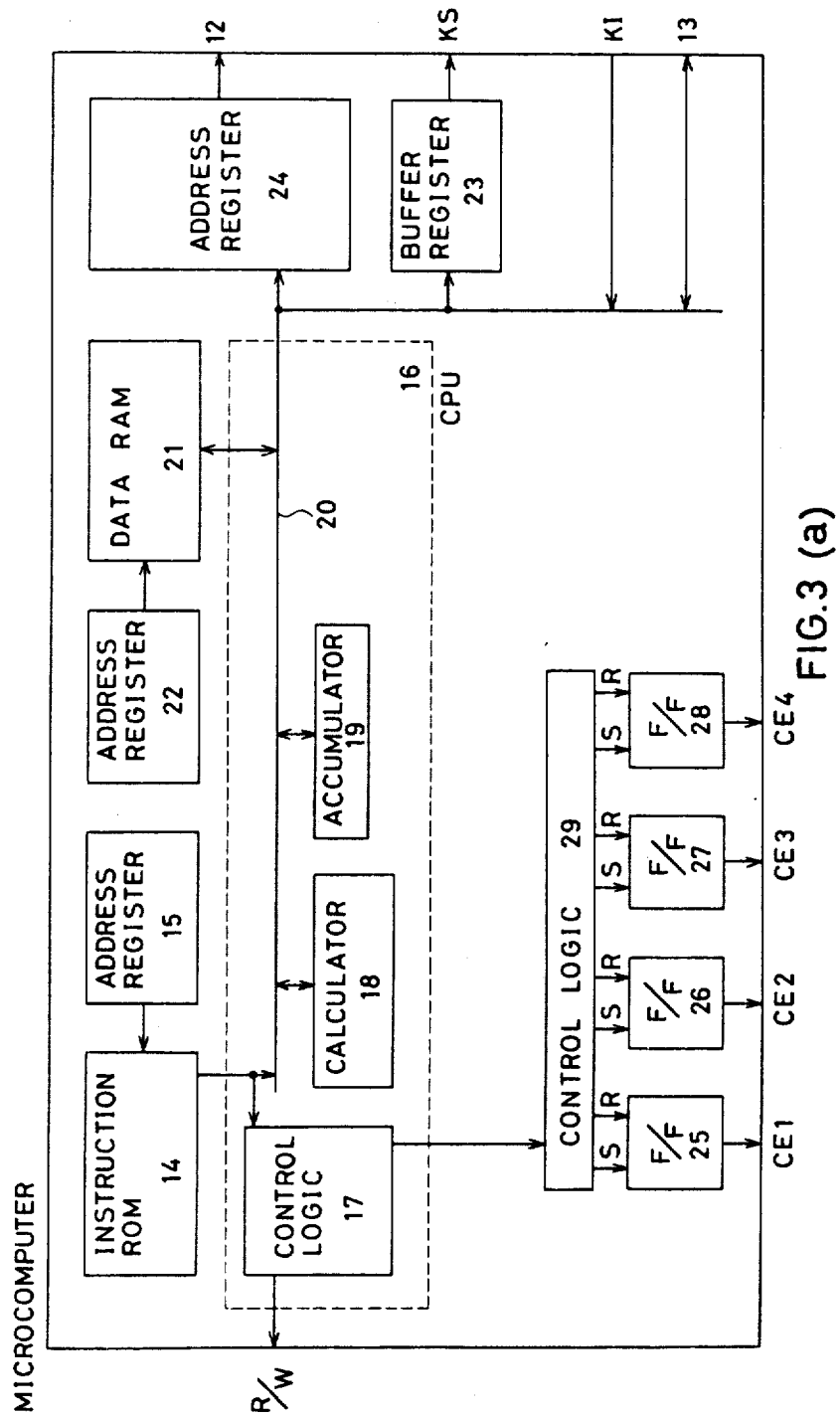
Figure 3:
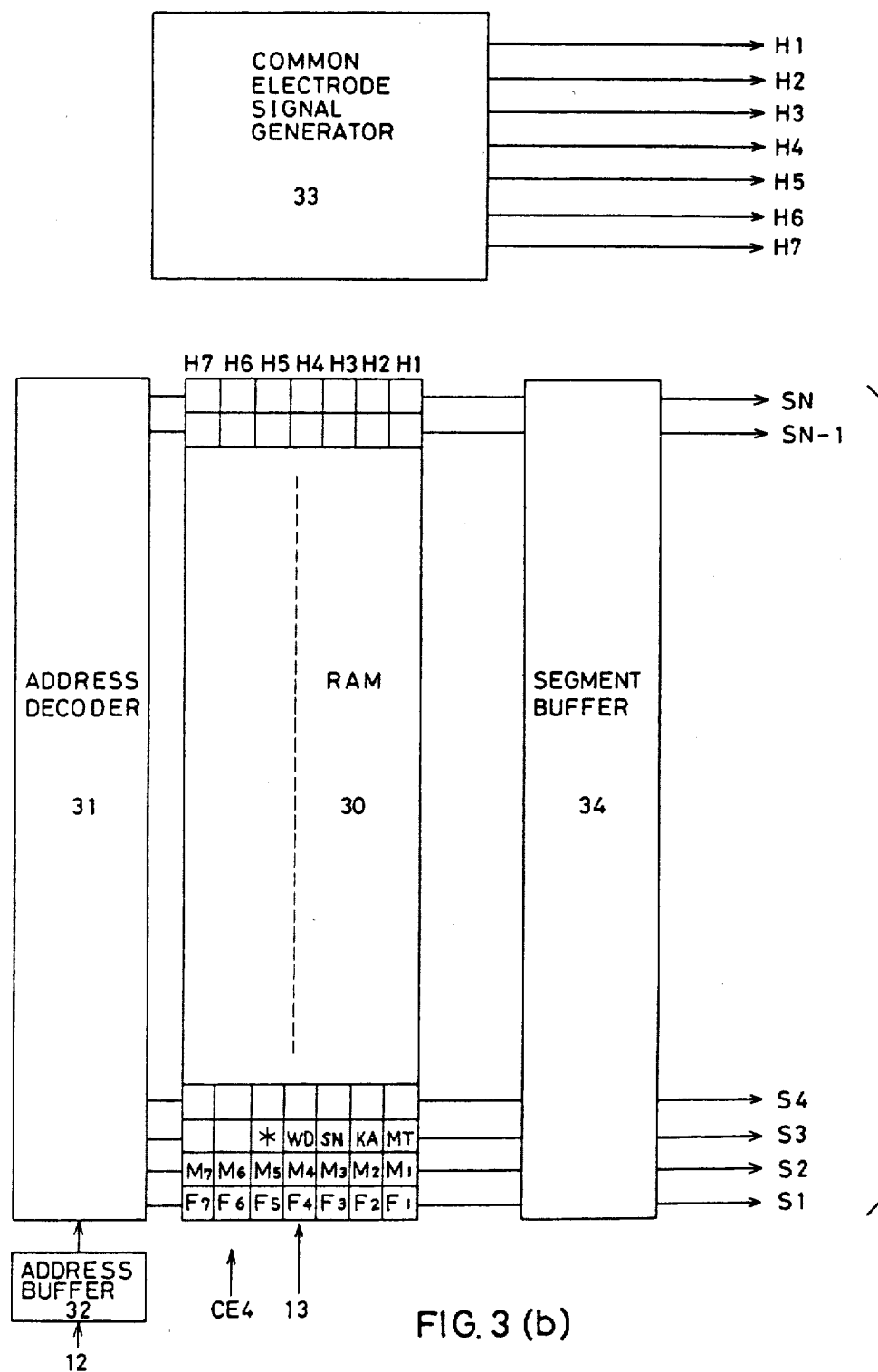

FIG. 3(a) shows a block diagram of the microcomputer 8 of FIG. 2. An instruction ROM 14 stores a number of types of instructions, each of which is used in a specific operation by the translator and is, preferably, in coded format. As the address of a ROM address register 15 is, in turn, advanced, the ROM 14 provides a specific kind of instruction. The specific instruction is applied to a CPU 16 so that the CPU 16 recognizes the instruction to perform the selected operation.

The CPU 16 comprises a control logic 17, a logic calculator 18, and an accumulator 19. An inner data bus is indicated by numeral 20. Date RAM 21 is provided for preliminarily containing data used for the translator and for functioning as a conditional flip-flop used for a branch in a program operation. Data from the CPU 16 is stored in a specific location in the data RAM 21 which is selected by a RAM address register 22. The data stored in such a location in the RAM 21 is provided to the CPU 16.

Numeral 23 represents an output buffer register for outputting key strobe signals KS entered into the key matrix circuit 7 so that the output of this circuit 7 is applied to the CPU 16 as key input signals KI. Numeral 24 indicates an address register for selecting the address of the external memory including the ROMs 9 to 11 and a RAM circuit within the driver 6. The output of the address register 24 is fed through the address bus 12. Control of the address register 24 to selectively increment or decrement a certain selected is carried out by the CPU 16. Since the CPU 16 is coupled to the data bus 13 as shown in FIG. 2, transmission of the data between the CPU 16 and the external memory is via the data bus 13. The direction of transmission of the data between them is defined by the read write signal R/W.

Each of flip flop circuits 25 to 28 is set or reset by a control logic 29. The control logic 29 is controlled by the CPU 16. The outputs of each of the flip flop 25 to 28 are referred to as chip selection signals $CE_1$ to $CE_4$.

FIG. 3(b) shows a block diagram of the driver 6 of FIG. 2. According to a preferable form of the present invention, the indicator 2 comprises a liquid crystal display. The character indicator 3 is formed as each $5 \times 7$ dot matrix in a single digit. One symbol of the kind of tongue indicator 4 and the symbol indicator 5 is formed with a single digit.

The driver 6 comprises a RAM 30, an address decoder 31, an address buffer 32, a common electrode signal generator 33, and a segment buffer 34. Each bit of the RAM 30 corresponds to each dot (segment) of the indicator 2. That is, when information of "1" is written in a certain bit of the RAM 30, a particular dot (segment) of the indicator 2 corresponding to the certain bit is indicated. When information of "0" is stored in a certain bit of the RAM 30, a particular dot (segment) of the indicator 2 corresponding to the bit is darkened.

In FIG. 3(b), $S_1$, $S_2$ and $S_3$ are referred to segment electrode signals used for illuminating symbols. $S_4$ to $S_N$ are referred to segment electrode signals used for indicating characters. $H_1$ to $H_7$ represent common electrode signals. $M_1$ to $M_7$ represents a symbol "▲" of the kind of tongue indicator 4, the symbol indicating the mother or source tongue or the original tongue which is not to be translated with the translator of the present invention. $F_1$ to $F_7$ represent another symbol "▼" of the same indicator 4, this symbol indicating the foreign tongue or the translated tongue which is to be translated with the translator of the present invention.

Further in FIG. 3(b), numerals 1 to 7 as the suffix are referred to English, German, Japanese, French, Spanish, another language "○", and further language "△", respectively. MT indicates a multivocal word. KA indicates a Japanese "Katakana" letter. SN represents a sentence while WD represents a word. A star "*" indicates that each of words represented in the mother tongue or the original tongue is translated to each of corresponding words represented in the foreign tongue or the translated tongue while grammatical correction and modification within the foreign tongue is not carried out.

The driver 6 provides displaying signals to the indicator 2 when display data is developed from the microcomputer 8 to apply them to the RAM 30. Since the driver 6 is of the conventional, further description is omitted.

Figure 4:
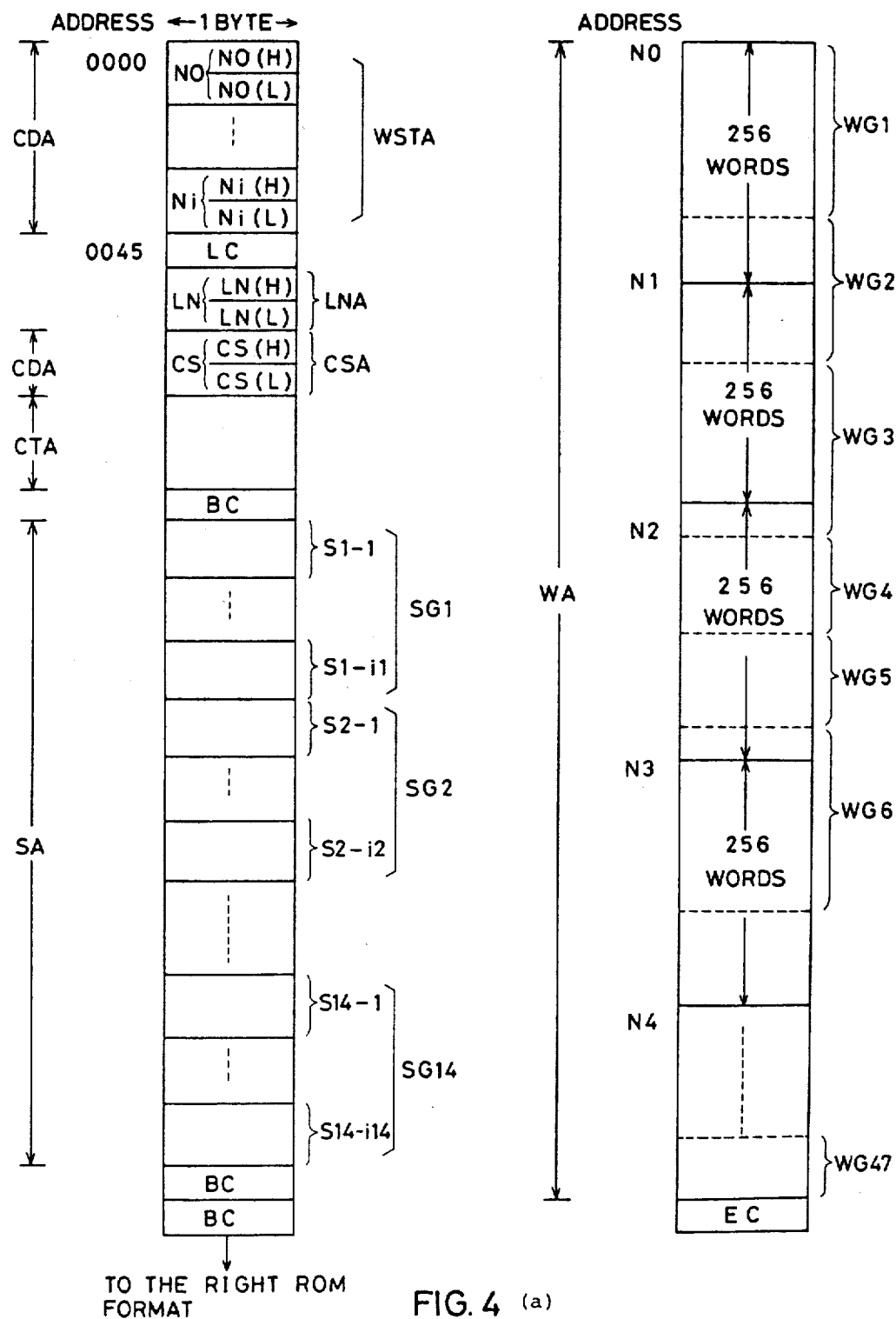
FIG. 4(a) shows a format of a ROM for memorizing words, the ROM being connected in the circuit of FIG. 2.
FIGS. 4(b) through 4(d) show formats of various types of ROM, the ROM being connectable to the circuit of FIG. 2.

FIG. 4(a) shows a format in which a great number of words are stored in each of the ROMs 9 to 11. This format contains a control data region CDA, a data-compression table CTA, a sentence data region SA and a word data region WA.

Each of the words is stored in the ROM such that its spelling is compressed. For example, in the ROM I 9, a pair of words "AN" is stored as a compressed code of 1 byte, $CC_1$. Another pair of words "BA" is stored as a compressed code of 1 byte, $CC_2$. Frequency in occurrence of spelling of English words determines how some English words are detected. The thus selected English spelling is changed to a corresponding compression code for memorizing purposes. The data-compression table CTA stores data for determining a correspondence between the selected spelling and the compression code.

When correspondence between an input words and one or words memorized in one of the ROMs is to be detected, the input words is changed to wodes inclusive of one of the compression codes according to the contents of the data-compression table CTA since each of the ROMs stores codes which may include one of the compression codes. The table CTA is used to show words stored in one of the ROMs by changing the codes to the original spelling. The information included in this table varies depending on the kind of language to optimize the degree of data compression.

Stored words are classified in 47 categories in each of which a number of words are ordered. In FIG. 4(a) a word category n is referred to WGn. Sentences are formed by a combination of a plurality of stored words. These sentences are classified as 14 categories in each of which a number of sentences are ordered. In FIG. 4(a) a sentence category m is referred to SGm containing a first sentence $S_{m-1}$ to last sentence $S_{m-im}$. Each of the categories belonging to each of the word categories WG1 to WG14 corresponds to each of the sentence categories SG1 to SG14.

The following table shows a relation between the serial number of the category and the name of the category.

TABLE 1-1

| The serial number of the category | corresponding key | the name of the category |
|---|---|---|
| 1 | "ra" or "δ" | airplane |
| 2 | "ri" or "I" | customs |
| 3 | "ru" or "A" | transporting machine |
| 4 | "re" or "J" | at hotel |
| 5 | "ro" or "S" | in restaurant |
| 6 | "m" or "T" | sight seeing |
| 7 | "mo" or "U" | amusement |
| 8 | "ho" or "V" | shopping |
| 9 | "no" or "W" | direction |
| 10 | "to" or "X" | business |
| 11 | "so" or "Y" | service |
| 12 | "ko" or "Z" | conversation |
| 13 | "O" or "." | at medical practitioner's Office |
| 14 | "SPC" or "o" | emergency |

Each category for the words contains 256 words. A first word address table region WSTA contains a first address referred to $N_0, N_1, N_2, \ldots N_4$ in FIG. 4(a). This first address is related to a location in which first codes or first compressed code for representing the first word is stored. In accordance with a specific example of the present invention, each address is represented with two bytes. Each first address is separated to an upper byte referred to as $N_0(H)$ to $N_i(H)$ and a lower byte referred to as $N_0(L)$ to $N_i(L)$. The first word address table region is used to shorten retrieval time for a specific word.

CS is referred to as a first sentence address CS(H) and CS(L) which is stored in a first sentence address region CSA. LNA indicates a memory location for storing a serial number of a word indication the kind of a specific tongue as referred to LN of LN(H) and LN(L). More particularly, as the ROM storing English words is concerned, a word "English" is necessarily contained in that ROM. In such a case, the serial number of the words "English" in the ROM is LN starting from the first word of the same kind of word group.

Memorizing the serial number LN is suitable for showing the kind of the mother tongue and the foreign tongue being selected and indicated by the character indicator 3 because it is unnecessary to additionally memorize a word showing the kind of tongue.

The translator of the present invention may comprise audible sound generating means for developing words represented in the mother tongue and/or the foreign tongue. Since such an audible sound genrating means is disclosed in, for example, Hyatt U.S. Pat. No. 4,060,848 issued Nov. 29, 1979, further description is omitted.

In FIG. 4(a), LC indicates a tongue code in which upper 4 bits indicate a field of language stored in the ROM and lower 4 bits the kind of language stored in the ROM. In particular, there may be present a ROM for storing words oriented to economy, engineering or medicine, respectively. Information representing such a field is stored in LC. The lower 4 bits corresponds to each kind of tongue as follows:

TABLE 1-2

| The lower 4 bits | the kind of language |
|---|---|
| 0 0 0 1 (1) | English |
| 0 0 1 0 (2) | German |
| 0 0 1 1 (3) | Japanese |
| 0 1 0 0 (4) | French |
| 0 1 0 1 (5) | Spanish |
| 0 1 1 0 (6) | another tongue "o" |
| 0 1 1 1 (7) | a further tongue "Δ" |

In FIG. 4(a) BC, "11111111" is a boundary code and EC "11111111" is an end code of the ROM.

Figure 4D:
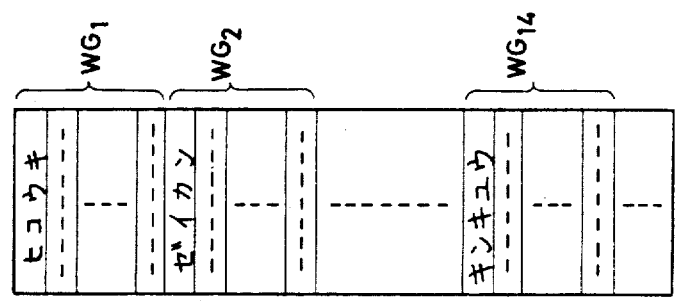
Figure 4C:
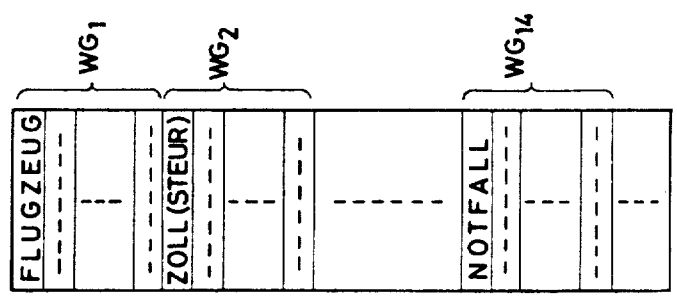
Figure 4B:
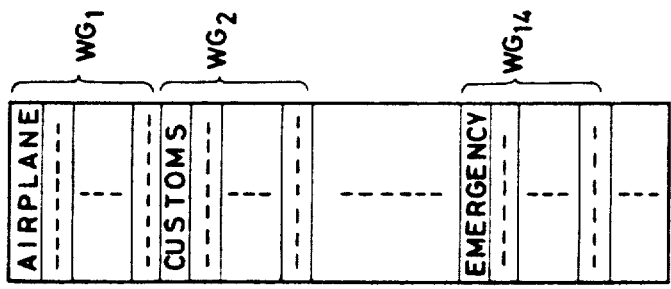

FIGS. 4(b) through 4(d) show formats of word categories in various types of ROMs containing English words, German words and Japanese words, respectively. These category words are identified as each first word stored in each category is the name of each category.

Figure 5:
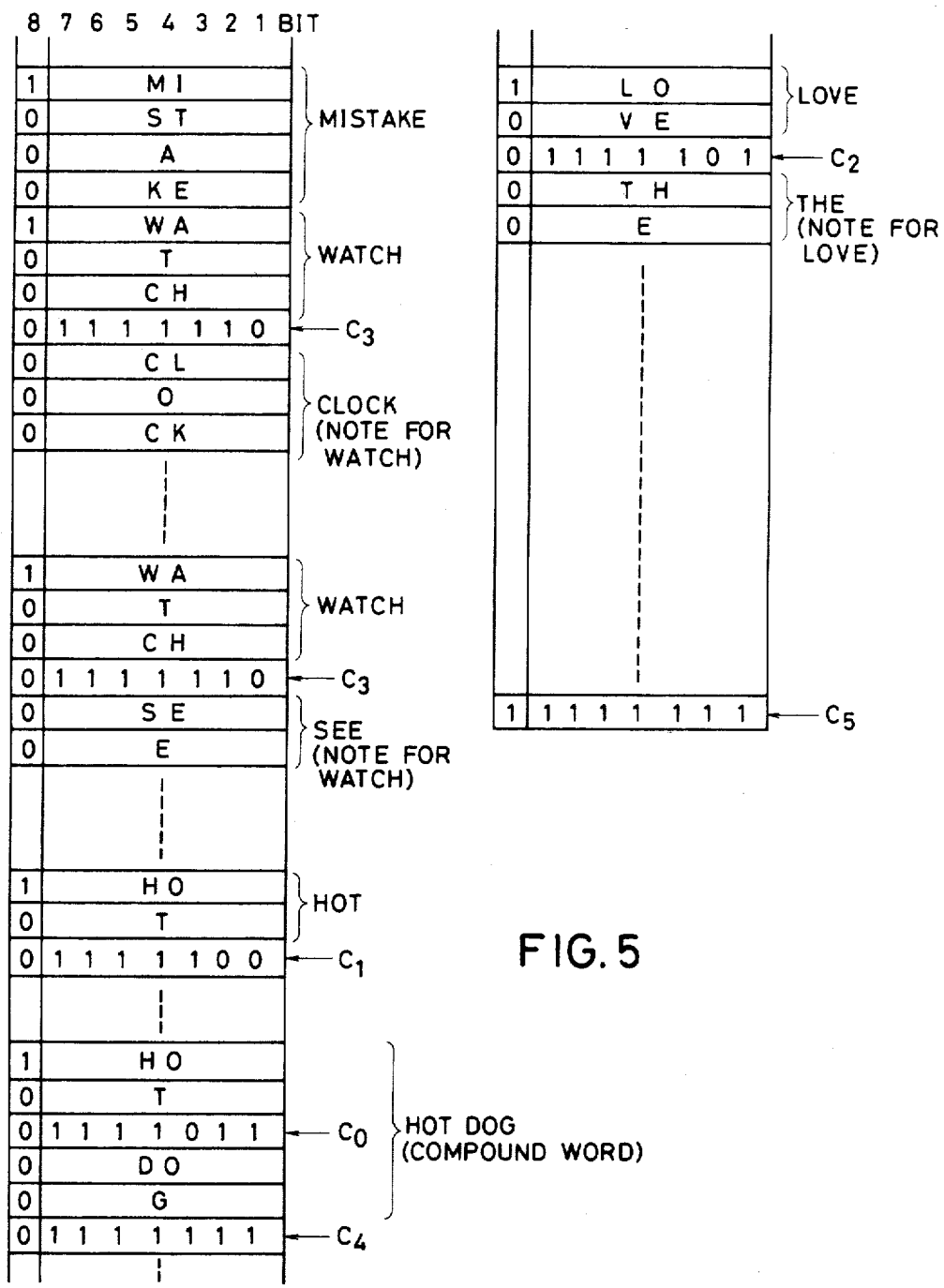
FIG. 5 shows a detailed format of a word data region WA in the format of FIG. 4(a)

FIG. 5 shows a detailed format in a word data region WA in the format of FIG. 4(a) where the ROM stores English words.

In the word data region WA, word data is ordered at the unit of 1 byte. The eighth bit of the first word in each word category is defined as "1" while the eighth bit of the second or more words is defined as "0". The first bit through the seventh bit are used to contain letter codes representing letters or compression codes representing letters in compressed manners. For example, a word "WATCH" is memorized such that a pair "WA" are represented by a single compression code of 1 byte, a pair "CH" are represented by another type of single compression code of 1 byte and a letter "T" is represented a letter code of 1 byte. Therefore, five letters of "WATCH" are stored with three bytes.

Each word having a specific meaning corresponds to each translated word. A word identical to another at least in spelling and a homonym, which is a word identical to another in spelling and pronunciation but with a different meaning, are stored each with a note for identification. FIG. 5 represents a word "WATCH" having two meanings of "CLOCK" and "SEE" so that each note is added as "WATCH (CLOCK)" and "WATCH (SEE)" with a bracket. These notes follow each note code $C_3$ (7E in a hexadecimal notation) in the word data region. The bracket for the note follows the noted word, normally. But, it may precede the noted word in which case the note follows the note code $C_2$ (7D in the nexadecimal notation). In FIG. 5, a note "THE" for a word "LOVE" is provided to be "(THE)LOVE".

A compound word formed by at least two words corresponds to each translated word. FIG. 5 shows an example of a compound "HOT DOG". Between the at least two words "HOT" and "DOG", a space code $C_0$(7B in the hexadecimal notation) is inserted. If at least one of the two words is memorized in one of the ROMs and is the first word of the compound, the last letter code of the word (the compression code) is followed by a compound code $C_1$ (7C in the hexadecimal notation). The word "HOT" in FIG. 5 is this type of word to thereby be followed by the compound code $C_1$. The compound code $C_1$ is aimed to indicate that there are present one or more compounds starting with the word "HOT".

As described above, the stored words are classified as 47 categories. A category separation code $C_4$(7F in the hexadecimal notation) is provided for showing separation of each category. This code follows all the words in the same category. In FIG. 5, this code follows the compound "HOT DOG". At the end of the word data region WA, an end code $C_5$ (FF in the hexadecimal notation) is provided.

FIG. 6 shows a table containing the letter codes, the compression codes, and the control codes each of which is used in the format of FIG. 5.

In the word data region, each of the word data occupies 1 byte. It may be possible to provide 256 alternations in connection with one type of data by the eight bits. But, the eighth bit is used to indicate the first data of each word. The remaining seven bits can be selectively combined to provide 128 alternations in connection with one type of data.

The codes in the shaded parts in the table of FIG. 6 are the figure codes, the symbol codes, and the control codes all of which are used in common with the respective tongues. In the remaining parts, the letter codes (alphabets in FIG. 6) and the compression codes are provided. The control codes $C_0$ to $C_5$ function as described in FIG. 5.

FIG. 7 shows a detailed format of the compression table, associated with the English words, in the format of FIG. 4(a). The format of FIG. 7 corresponds to the compression table of FIG. 6.

In FIG. 7, the lower seven bits associated with the eighth bit of "1" represent letters as the letter codes. The lower seven bits associated with the eighth bit of "0" are the compression codes for the preceding letter codes. An end code $C_6$ is provided for representing the end of the compression codes. The compression table differs, depending on the type of tongue so as to select the highest efficiency.

FIGS. 8(a) through 8(d) show detailed formats of the sentence data region SA in the format of FIG. 4(a) related to English or Japanese.

A plurality of words form a sentence where each of the words is memorized with a compression code.

At the start of a word, the eighth bit is represented as "1". Letter codes or compression codes representing the particular word are contained before next occurrence of the eighth bit of "1". For separation of the sentences, two types of codes $C_7$ and $C_8$ are used in which $C_7$ is added following an affirmative sentence and $C_8$ is added following an interrogative sentence. The code $C_7$ is "FE" in the hexadecimal notation and $C_8$ is "FC" in the same.

Figure 8:
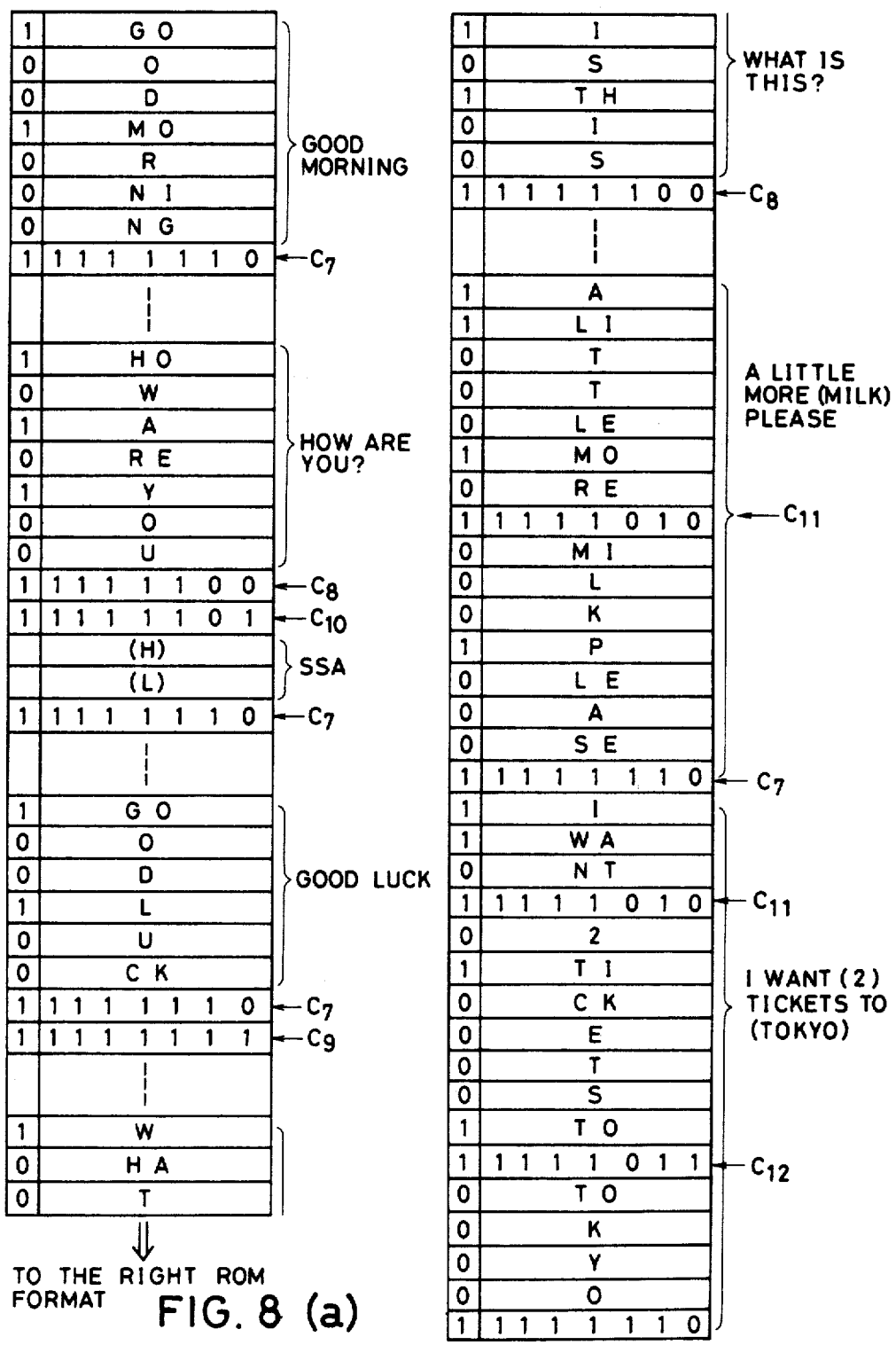
FIGS. 8(a) through 8(d) show detailed formats of a sentence data region SA in the format of FIG. 4 (a)

As described above, the memorized sentences are classified in 14 categories. A category separation code $C_9$ is used for indicating separation between the categories. The code $C_9$ is represented as "FF" in the hexadecimal notation. This code $C_9$ follows the code $C_7$ or $C_8$. FIG. 8(a) shows a sentence "GOOD LUCK." which is memorized at the end of a particular sentence category.

It may be possible that the same sentence is included in two or more categories. In such a case, to reduce the number of bytes for the memory, the sentence is memorized as such in one category while the leading address of the stored sentence in this category is memorized in another category. An address memory code $C_{10}$ (FD in the hexadecimal notation) is used for this control purpose. Two bytes following the code $C_{10}$ are used to memorize an address "SSA" for the code (compression code) of the leading letter of the first word contained in the sentence which is in common.

As a feature of the translator according to the present invention, one or more words in an exemplary sentence in an original language can be altered with one or more different words in the original language to form another type of sentence in the original language. The thus modified sentence is then translated. Such words which can be altered are provided with brackets in a displayed form of the sentence. At most, two words can be altered in a single sentence as shown in FIG. 8(a).

FIG. 8(a) shows an exemplary sentence of "A LITTLE MORE (MILK) PLEASE.". A word provided within brackets is specified by a bracket 1 code $C_{11}$(FA in the hexadecimal notation).

With the eight bit code of "0" following this code $C_{11}$, the lower seven codes are the letter codes (the compression code). When two words are to be inserted within the brackets as being a phrase or an idiom, the code $C_{11}$ is inserted between the words. For example, a phrase of "CHECK IN" is inserted between the words to thereby form a code line of "Code $C_{11}$, CHEK, Code $C_{11}$, IN" as indicated in FIG. 8(b).

FIG. 8(c) shows another example, say, "I WANT (2) TICKETS TO (TOKYO)." when represented in English. (2) is represented by use of the code $C_{11}$ while (TOKYO) is represented by use of another bracket code $C_{12}$ (FB in the hexadecimal noration). The code $C_{11}$ need not necessarily precede the code $C_{12}$. FIG. 8(c) shows an example represented in Japanese. As indicated in FIG. 8(c), the code $C_{12}$ precedes the code $C_{11}$ since order of words are different between English and Japanese.

The translator, of the present invention the first brackets in an English sentence are represented with the code $C_{11}$ and the second brackets in the English sentence are represented with the code $C_{12}$. In a language different from English, the first brackets which are former in the English translated sentence are represented with the code $C_{11}$ and the second brackets which are latter in the English translated sentence are represented with the code $C_{12}$. When only one bracket pair are used in a sentence, the code $C_{11}$ is necessarily used.

[OPERATION OF THE TRANSLATOR]

(1) Display

With reference to FIG. 1, the letter indicator 3 displays alphabets, Japanese "Katakana" letters, figures and symbols. The kind of tongue indicator 4 displays the marks "▼" and "▼". The symbol indicator 5 contains the symbols MT, KA, SN and WD specified with the symbol "▼", and the star "*". Display of these symbols is enabled with control of the driver 6 by developing corresponding data from the microcomputer 8.

(2) Translation principle

The system of FIG. 2 has the capability of translating three kinds of languages to one another. Each of ROM memorizes a great number of words and sentences as shown in FIG. 4(a). Each of words and sentences corresponds to each of translated words and translated sentences. This correspondence is assured by the numbers of words and sentences which are in common between the ROMs. More particularly, a specific sentence "GOOD MORNINGS." is assumed to be memorized as the 100th sentence in a ROM related to English.

A corresponding sentence of Japanese translated words is stored in the 100th sentence in another ROM related to Japanese. A further corresponding German translated sentence "GUTEN MORGEN." is stored in the 100th sentence in a further ROM related to German.

Similarly, any specific word in a particular numbered location in a first ROM corresponds to a translated word ordered in the corresponding location in a second ROM.

The translation operation conducted by the translator finds the serial number of a word or a sentence in the mother tongue ROM and, accordingly, detects a translated word or sentence having the same serial number in the foreign tongue ROM.

The translation operation comprises the following steps:
(i) the first step: selecting a specific ROM of the mother tongue
(ii) the second step: detecting the serial number of a word or a sentence in the thus selected ROM
(iii) the third step: selecting the specific ROM of the foreign tongue, and
(iv) the fouth step: detecting a translated word or a translated sentence having the serial number in the specific ROM of the foreign type.

(3) Translation of a Specific Sentence Addressed with Selection of a Catagory

With reference to FIG. 1, keys specified with each of $L_1$ through $L_{14}$ are category selection keys. If necessary, a picture suggesting the category may be provided adjacent each of category selection keys. Selection by each of these keys is enabled following actuation of an SN/WD key 41 and the indicator 5 displays the mark "▼".

A SRC key 42 is actuated for subsequently searching a plurality of sentences belonging to the same category. After the last sentence in the category is outputted, the first sentence in the category is to be addressed. When a sentence is addressed, the serial number of this sentence is also outputted. A TRL key 43 is actuated for enabling the third step and the fourth step as described in item 2 to provide translation of this sentence.

Translation of a specific sentence addressed where selection of a category is enabled according to the following steps:

(i) the first step: selecting a specific ROM associated with the mother tongue
(ii) the second step: illuminating the mark "▼" by actuating the key 41
(iii) the third step: actuating one of the category keys $L_1$ through $L_{14}$
(iv) the fourth step: addressing subsequently the SRC key 42 so that the serial number of the specific sentence is detected and the translation key 43 is actuated
(v) the fifth step: selecting another ROM associated with the foreign tongue
(vi) the sixth step: detecting a translated sentence having the serial number in the ROM associated with the foreign tongue (4) Translation of an Entered Word The spelling of a word is entered by actuating letter keys 44 and the translation key 43 is actuated to provide translation from the mother tongue to the foreign tongue indicated by the indicator 4. Some cases of operation may be different from one another depending on the type of spelling entered as follows.

(i) the spelling entered is not found in the ROM of associated with the mother tongue
(ii) only one type of spelling identical with the spelling entered is present in the ROM associated with the mother tongue.
(iii) a plurality of spellings identical to the spelling entered are present in the ROM associated with the mother tongue In connection with item (i), no word is discovered in memory which is identical with the entered word. This is indicated by a double exclamation mark "!!" following the end of the entered word which is displayed after actuation of the translation key 43.

In connection with item (ii), the serial number of the identical spelling in the ROM of the mother tongue is detected selection of the ROM having the foreign tongue is enabled and a translated word having the same serial number in the selected ROM of the foreign tongue is detected and displayed.

For example English is selected as the mother tongue and Japanese is selected as the foreign tongue. A word "SEE" is entered and the translation key 43 is actuated. Under these circumstances, the first word in the English ROM is addressed so that equivalency between spelling of the entered word and the first word is determined. When there is no equivalency, a counter for storing the serial number of the word is advanced by one to address the second word. If the word of "SEE" is detected in the English ROM by advancing the address of the counter up to the serial number, say, 500 of this word, equivalency is detected. The Japanese ROM is then selected so that a translated word is developed by specifying the Ser. No. 500 of the Japanese ROM. Translation is thus enabled.

In connection with item (iii), these homonyms are noted in the memorized format as indicated in FIG. 5. A specific concrete meaning is determined by the operator of the translator. A specific display with a note and a mark "!?" following the entered word is enabled to indicate that the entered word is associated with a plurality of translated words.

In particular, a word 'WATCH' of FIG. 5 is assumed to be entered. Firstly, this word is entered and the translation key 43 is actuated to indicate

"WATCH (CLOCK) !?".

Now the search key 42 is actuated to indicate another translated word equivalent to the word "WATCH".

"WATCH (SEE) !?"

When either of these alternative displays is displayed, the translation key 43 may be actuated to obtain a corresponding translated word. At the same time, when the homonym is entered as noted by the notes, the indicator 5 illuminates the symbol " " directed to MT indicating that there are one or more additional translated words equivalent to the entered word.

(5) Translation of two or more entered words

The instant translator can translate two or more entered words. The space key 45 is actuated to separate these words from one another. When the first word is entered and the space key 45 is actuated, the second word can be entered if the first word entered is contained in the ROM of the mother tongue. If the first word is not stored in the ROM or has a homonym, operation similar to items (i) and (iii) is conducted.

Under the circumstances that all of the words "I", "AM", "A" and "BOY" are assumed to be memorized in the English ROM, entry operation of "I", "SPC", "AM", "SPC", "A", "SPC" and "BOY" is conducted to indicate in the display 3.

"I AM A BOY".

Upon actuation of the translation key 43, translated words are displayed on the display 3 while the order of the translated words is identical to the order of the entered words. That is, regardless of the grammatical order by the grammer in the translated tongue, the translated words respectively corresponding to the entered words are directly aligned. The star "*" is indicated in the indicator 5 representing this situation.

(6) Entry of words with the brackets and translation thereof

With reference to FIG. 8(a), an exemplary sentence "A LITTLE MORE (MILK) PLEASE." is addressed to indicate "A LITTLE MORE ((MILK)) PLEASE." Upon actuation of the translation key 43, a translated sentence which is stored in the format of FIG. 8(d) in the Japanese version, is indicated in which a translated word corresponding to "((MILK))" is indicated with a single bracket.

While the exemplary English sentence is indicated, a word "COFFEE" is entered by the alphabetical keys to indicate

"A LITTLE MORE ((COFFEE)) PLEASE."

Upon actuation of the translation key 43, a corresponding translated sentence is formed and displayed only on the condition that the word "COFFEE" is memorized in the English ROM. When not, operation similar to item (i) or (iii) of item (4) is conducted.

Modification and translation of the word provided with the brackets are effected follows:

A sentence with the brackets is addressed by following the first to the fourth steps of item (3):

(v) the fifth step: the word contained within the brackets in the addressed sentence is replaced by the word entered before the translation key 43 is actuated (iv) the sixth step: in the ROM of the mother tongue, a word having the spelling of the entered word is detected and the serial number thereof is detected In case where such a word can not be detected in the ROM or otherwise there are two or more words having the spelling of the entered word, operation similar to item (i) or (iii) of item (4). The following steps should be effected corresponding to item (ii) of item (4).

(vii) the seventh step: selecting the ROM of the foreign tongue (viii) the eighth step: extracting a sentence having the same serial number as the memorized serial number from the ROM of the foreign tongue so that the sentence is applied to the buffer register. The $C_{11}$ code or the $C_{12}$ code is also applied to the buffer register.

(iv) the ninth step: extracting the word having the same serial number as that of the word which is detected in the six step and inserting the extracted word between the brackets represented by the bracket code applied to the buffer register in the eighth step With respect to a sentence having the two pairs of brackets, the bracket key 46 is actuated for inserting a desired word between the brackets. The following sentence is excemplified.

"I WANT ((2)) TICKETS TO (TOKYO)"

The former brackets are displayed as double brackets while the latter ones are displayed as single brackets. An entered word or phrase is to be inserted between the double brackets. Upon actuation of the bracket key 46, the single bracket is replaced by the double brackets while the double brackets are replaced by the single bracket. Thus, the word contained in the latter and double brackets can then be replaced by new entered one. Position of the double brackets is changed each time the bracket key 46 is actuated. Translation of the entered word or phrase is conducted by the manner as described above.

(7) Retaining the Word Without Translation

A holding key 47 is actuated for identifying a person's name or a proper noun which can and should not be translated. Actuation of the holding key 47 follows entry of this kind of word. Even when the translation key 43 is actuated, this kind of word is not translated to indicate the entered word as such. If the translation key 43 is actuated following entry of this kind of word, the double exclamation mark is added to the end of the entered word, which is indicated as described in item (4). In such a case, the translation key 43 is further actuated and the above holding operation is effective in the same manner as in the case of actuation of the holding key 47.

(8) Automatically Retaining the Entered Word Without Translation

Figures "0" through "9" and symbols "$", "." (period) ";" (colon), "?" (question mark) are not subjected to translation under the condition they are not added to any other words. No necessity is required to actuate the holding key 47.

(9) Addressing words classified in the categories

As shown in FIG. 4(a), the words are classified as 47 categories so that each of the words can be addressed in the similar manner as in the case of addressing each of the sentences according to the kind of category.

(10) Searching each of words entered by the keyboard

Each of words entered by the keyboard can be randomly accessed according to its spelling.

A specific feature of the translator of the present invention is now described. This specific feature of the present invention relates to a technique for accessing in turn one or more sentences from the ROM and for identifying one sentence. More particularly, the one or more sentences are accessed and specified by referring to at least one key word contained in the sentence sought. The key word is entered with a key input operation.

Figure 9:
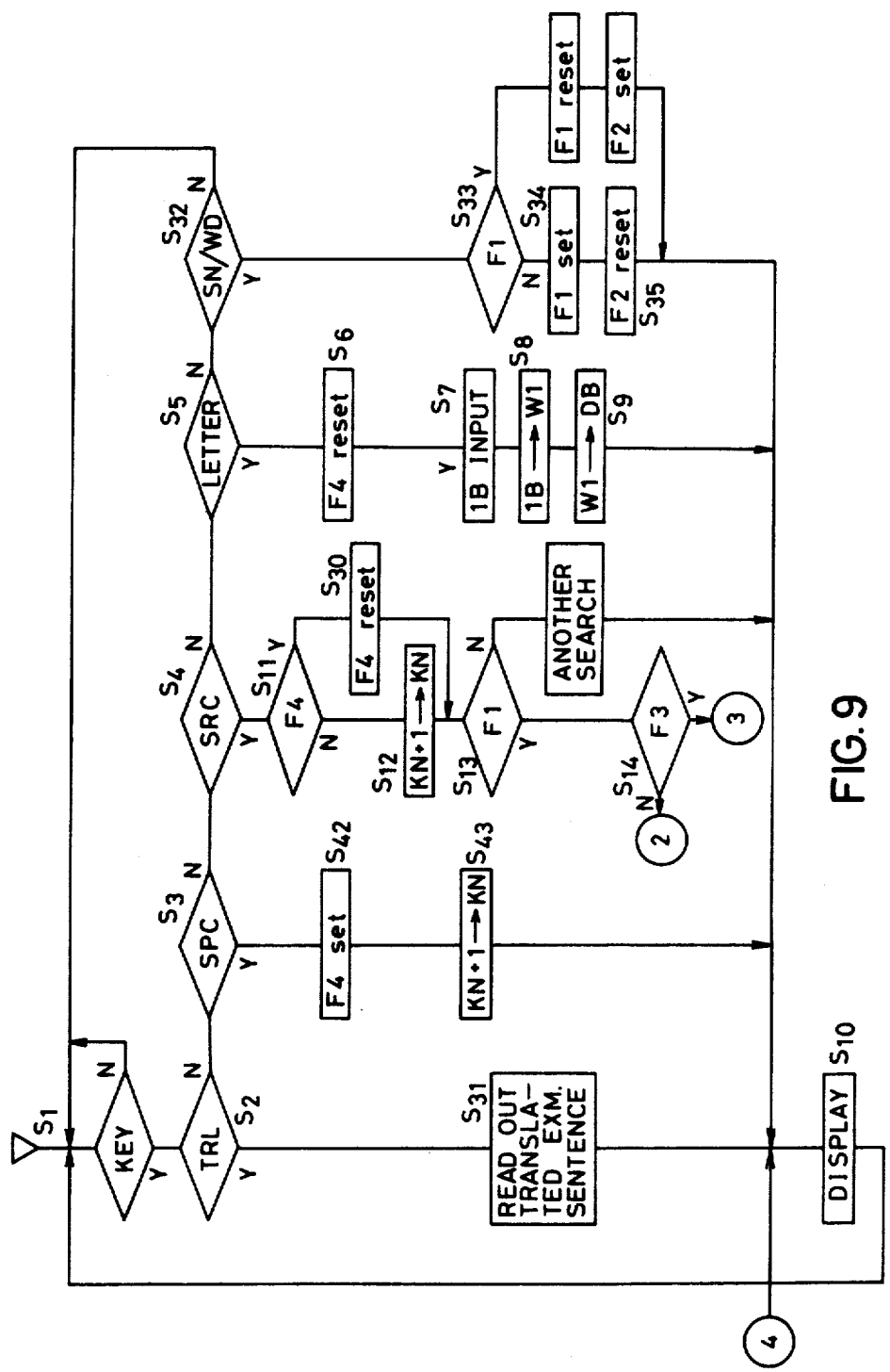
FIGS. 9 and 10 show flow charts of operation by this translator according to the present invention.
Figure 10:
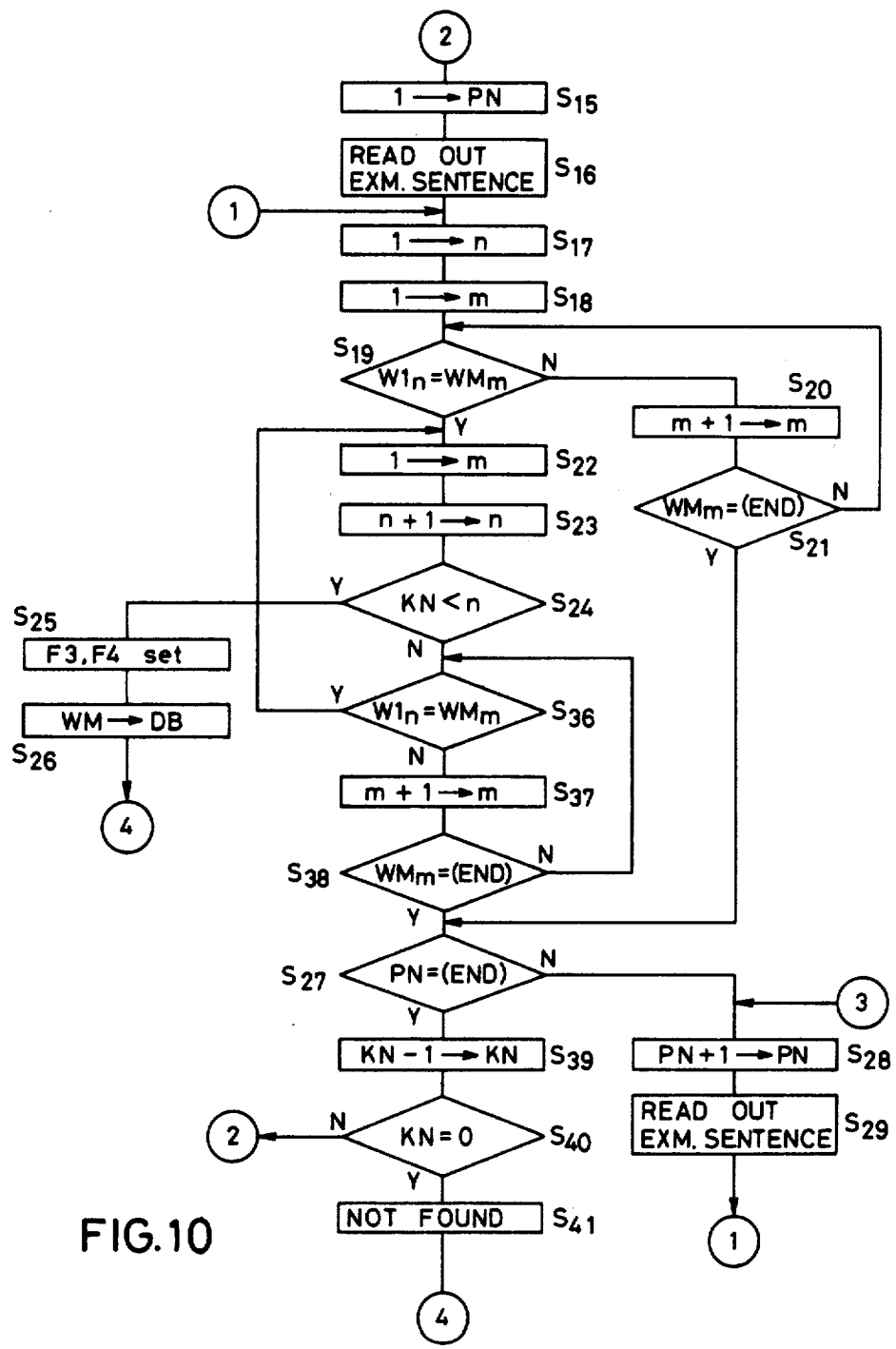

FIGS. 9 and 10 each show flow charts of the operation of the electronic translator according to the present invention.

In these flow charts, KN indicates a counter for counting the number of the key word or words to be selected. IB is a buffer for storing key information entered. WI is a buffer for storing the key word or words, WM represents a buffer for storing at least one sentence which is accessed from the memory. PN represents a counter for storing a serial number of the sentence. DB denotes a buffer used for displaying. Character "n" indicates a pointer for indicating a serial number of the word in the buffer WI. Character "m" is a pointer for indicating a serial number of the word in the buffer WM.

Further, $F_1$ is a flag for showing a condition in searching a sentence. $F_2$ is a flag for pointing out a condition in searching a word. $F_3$ is a flag for indicating that a corresponding sentence is detected during the search using the key word. $F_4$ is a flag for indicating that a space key 45, referred to as "SPC" in FIG. 1, is actuated, just before actuation of the search key 42 in FIG. 1, during retrieval using the key word.

With reference to the flow charts of FIGS. 9 and 10, the following operation is described.

(A) only one key word used

It is assumed in this example of operation that the mother tongue is English and the foreign tongue is Japanese during retrieval of any sentence.

(i) Key input of "BUS" with alphabetical keys is enabled to select $S_1 \rightarrow S_2 \rightarrow S_3 \rightarrow S_4 \rightarrow S_5$. In $S_5$, it is detected whether any alphabetical key is actuated. Because of "YES" in $S_6$ the flat $F_4$ is reset. In $S_7$, the word the "BUS" is applied to the buffer IB. $S_8$ is executed to transfer the contents of the buffer IB into the buffer WI. $S_9$ is performed to transfer the contents of the buffer WI into the buffer DB. In $S_{10}$, the word "BUS" is displayed.

(ii) Key input of the "SN/WD" key 41 is enabled to select $S_1 \rightarrow S_2 \rightarrow S_3 \rightarrow S_4 \rightarrow S_5 \rightarrow S_{32}$. In $S_{32}$, "YES" is obtained since the "SN/WD" key 41 is actuated to thereby select $S_{33}$ in which the flat $F_1$ is detected. In an initial condition, the flag $F_1$ is reset, but, it is set in $S_{34}$. In $S_{35}$, the flag $F_2$ is reset.

(iii) Key input of the "SRC" Key 42 is enabled to select $S_1 \rightarrow S_2 \rightarrow S_3 \rightarrow S_4$. In $S_4$, "YES" is detected. In $S_{11}$ the flag $F_4$ is detected to be set or not. In this instance, "NO" is defined. In $S_{12}$, "1" is added into the counter KN. In $S_{13}$, the flag $F_1$ is detected to be set or not. $S_{14}$ is selected to find that the flag $F_3$ is reset. Then, a step 2 of FIG. 10 follws.

Figure 11:
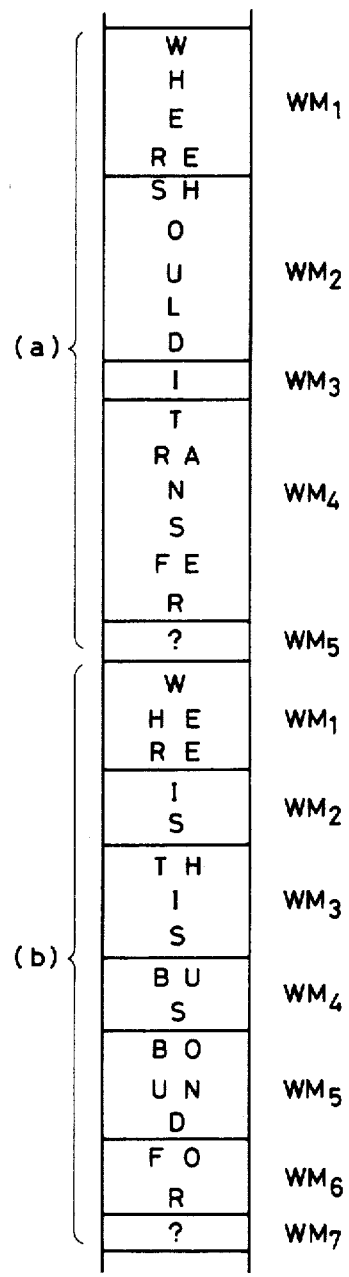
FIG. 11 shows another detailed format of the sentence data region SA in the ROM of FIG. 4(a).

The step 2 of FIG. 10 is selected to search a sentence depending on the key word inputted in item (i). With reference to the routine of FIG. 10, $S_{15}$ is executed to add "1" into the counter PN. $S_{16}$ is executed to access an example sentence numbered as "1". $S_{17}$ is performed to enter "1" into "n". $S_{18}$ is executed to enter "1" to "m". $S_{19}$ is executed to compare a first word referred to an $WN_1$, contained in the example sentence outputted in $S_{16}$, and the entered word $WI_1$ applied to key input. It is assumed that the sentence numbered as "1" is memorized as (a) of FIG. 11. FIG. 11 shows a detailed format of memorizing the sentence in the ROM.

As shown in format (a) of FIG. 11, a location referred to as "WM1" contains a word of "WHERE". Then, this word "WHERE" does not correspond to the word "BUS" of WI1. $S_{20}$ is executed to enter "m+1" into "m". $S_{21}$ is selected to detect whether WM2 is an "END" code showing a period or a question mark or not. Since WM2(="SHOULD") is not any END code, $S_{19}$ is returned to compare WI1 and WM2. Thus, a loop of $S_{19} \rightarrow S_{20} \rightarrow S_{21} \rightarrow S_{19}$... is repeated to compare WI1 and WMm (m=1...5).

Since the sentence of (a) in FIG. 11, say, numbered as "1", contains no word of "BUS", $S_{21}$ is finally selected to determine that WM5 is the "END" code. The, $S_{27}$ is selected to detect whether the examined sentence is a last sentence or not. If "NO", $S_{28}$ is selected to add "1" into the counter PN so as to specify and access a next sentence.

$S_{29}$ is selected to access the next sentence and return to a step 1 and then step $S_{17}$. $S_{18}$ is selected to enter "1" to "m". The loop of $S_{19} \rightarrow S_{20} \rightarrow S_{21} \rightarrow S_{19}$... is repeated. In m=4, WI1=WM4 is detected. When a format (b) of FIG. 11, WM4 is "BUS". $S_{22}$ is executed to enter "1" into "m". In $S_{23}$, "n+1→n" is enabled for "n" to have "2". In $S_{24}$, it is determined whether KN<n or not. Now, KN=1 by the operation in $S_{12}$. "YES" is found in $S_{24}$. In $S_{25}$, the flags $F_3$ and $F_4$ are set. In $S_{26}$, the contents of the sentence numbered as "2" are transferred into the buffer DB. Then, a step 4 is selected to provide the following sentence:

"WHERE IS THIS BUS BOUND FOR?"

(iv) Under the circumstances, the operator can determine which is the sentence sought. If this sentence displayed is not one sought, the "SRC" 42 is actuated again. Upon actuation of the key 42, $S_4 \rightarrow S_{11}$ is selected. As the flag $F_4$ is set in $S_{25}$, "YES" is obtained in $S_{11}$ to select $S_{30} \rightarrow S_{13}$. The flag $F_1$ is set to select $S_{13} \rightarrow S_{14}$.

The flag $F_3$ is set in $S_{25}$ to select $S_{14} \rightarrow$ 3 . Then, according to $S_{28} \rightarrow S_{29}$, another sentence numbered "3" is selected and examined as described above. If a sentence sought by the operator is the following sentence, this sentence is accessed at last and displayed.

"WHERE IS THE BUS STOP TO (KYOTO)?"

(v) In such a case, the operator actuates the "TRL" key 43 to translate the above sentence. Upon actuation of this key 43, $S_1 \rightarrow S_2 \rightarrow S_{31}$ is selected in which the contents of the counter PN, a Japanese translated sentence corresponding to the serial number of the sentence is accessed and displayed. The word "(KYOTO)" is also contained in the Japanese translated sentence.

(B) two or more key words used

The description below explains the case of using two key words, "BUS" and "STOP" to retrieve a sentence. Key operation for this purpose is as follows:
 (a) entering "BUS";
 (b) actuating the "SPC" key 45;
 (c) entering "STOP";
 (d) actuating the "SN/WD" key 41; and
 (e) actuating the "SRC" key 42.

"BUS" is set as WI1 and "STOP" is set as WI2. Retrieval is different from the case of item (A) as described below. Each time the "SPC" key 45 is actuated, $S_3 \rightarrow S_{42} \rightarrow S_{43}$ is selected so that the value of the counter KN is improved by "1".

It should be noted that, if the "SRC" key 42 is actuated subsequent to the "SPC" key 45, the addition to the counter KN is not effective in $S_{12}$ because the flag $F_4$ is set in $S_{42}$. The reason is that counting the number of key word or words is carried out by adding the counted number of actuations of the "SPC" key 45 and the counted number of actuations of the "SRC" key 42.

After item (e) is completed, the first key word is subjected to retrieval similar to that of case (A). In case (A), when the example sentence numbered as "2" is accessed, in $S_{19}$ WI1=WM4 is detected. Further, in $S_{22}$, "1" is entered into "m". In $S_{23}$ "2" is applied into "n". In case (A), "YES" is obtained in $S_{24}$ because of only one key word.

On the contrary, case (B) provides the two key words and KN=2. Therefore, "NO" is detected in $S_{24}$. $S_{36}$ is executed to compare WI2 (the second key word) and WM1. WI2 is "STOP" while WM1 is "WHERE" as shown in format (b) of FIG. 11. "NO" is detected in $S_{26}$. "1" is added into "m" in $S_{37}$. $S_{38}$ is executed to determine whether WM2 is the "END" code or not. "NO" is detected in $S_{38}$ and $S_{36}$ is again selected to provide comparison.

Thus, a loop of $S_{36} \rightarrow S_{37} \rightarrow S_{38} \rightarrow S_{36} \rightarrow$ ... is repeated. However, in the sentence numbered "2", as shown in format (b) of FIG. 11, no word similar to "STOP" is contained. Therefore, $S_{38}$ is selected at least to determine that WM7 is the "END" code. $S_{27}$ is selected to detect whether the examined sentence is a last one or not. If "NO", $S_{28}$ is selected to increment the serial number of the example sentence by "1". $S_{29}$ is selected to access a next example sentence and lead to step 1 and, then $S_{17}$.

Since each of "n" and "m" has "1" in $S_{17}$ and $S_{18}$, the above retrieval is repeated. If it is found that an example sentence has "BUS" and "STOP", $S_{36}$ is executed to detect WIn=WMm. $S_{22} \rightarrow S_{23} \rightarrow S_{24}$ is selected in which KN=2 and "n" contains "3". "YES" is detected in $S_{24}$ to select $S_{25} \rightarrow S_{26}$, so that the sentence corresponding to the serial number detected is displayed.

If it is found that no sentence containing "BUS" and "STOP" is memorized, $S_{27}$ is executed to detect that all the sentences ending in a last sentence are retrieved. $S_{39}$ is selected to substract "1" from the value in the counter KN so that KN=1.

Since KN≠0 is detected in $S_{40}$, step 2 is selected to provide the retrieval as similar to the case of KN=1. In other words, sentences are retrieved if they include the word "BUS". If no sentence containing "BUS" is memorized, $S_{40} \rightarrow S_{41}$ and, then, step 4 is selected. $S_{10}$ is executed to show that no corresponding sentence is memorized.

The above key word or words used in specifying a particular sentence are provided in the form of letter or letters. Obviously, the key word or words can be in the form of any symbol or mark such as an exclamation mark or a question mark. Further, the key word or words can be used by selection of a particular category to provide sentences in this category. The key word or words are used, in the above description, where no particular category is specified.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A system for translation between source and target language comprising:
    input means for entering a key word in the source language and for selecting a subject category relating to the subject of the translation;
    first memory means for containing sentences in said source language, said source language sentences being arranged according to subject category;
    second memory means for containing sentences in said target language, said target language sentences being arranged in said second memory means with addresses corresponding to the addresses of the source language sentences in said first memory means having the same meaning;
    first addressing means responsive to said input means for selecting an address location in said first memory means corresponding to the beginning of the selected subject category;
    search means responsive to said input means and said first addressing means for searching said first memory means and comparing said entered key word to the words of the sentences within said selected subject category in said first memory means, said search means identifying a sentence containing said key word and its associated address;
    said first addressing means incrementing said address location by one after each comparison by said search means until said search means identifies said sentence containing said key word and its associated address;
    second addressing and retrieval means for accessing the target sentence located at the address in said second memory means corresponding to the address of the sentence in said first memory means containing the key word and retrieving said target sentence; and
    display means responsive to said second addressing and retrieval means for presenting said target sentence to the user of the system.

2. The system of claim 1 wherein said means for displaying visually displays the target sentence.

3. The system of claim 2 wherein said means for displaying is responsive to said search means and displays the identified sentence containing said key word.

4. The system of claim 1 wherein more than one key word may be entered via said input means and wherein said search means identifies a sentence containing every said key word.

5. The system of claim 1 wherein said means for displaying audibly speech synthesizes the target sentence.

6. A method of translating between source and target languages using a digital computing device comprising:
    entering a key word in the source language contained within the desired sentence;
    selecting a subject category which the desired sentence pertains to from a plurality of subject categories arranged in a source language memory;
    accessing the selected subject category in the source language memory;
    sequentially searching the sentences within the selected subject category to determine the coincidence between a word contained within one of the sentences and the entered key word and determining the address of the thusly identified sentence upon determination of a coincidence; accessing a corresponding address in a target word memory to obtain the sentence translation in the target language of the identified sentence;
    displaying the sentence translation in the target language.

7. The method of claim 6 wherein said step of displaying includes visually displaying the sentence translation in the target language.

8. The method of claim 7 further comprising visually displaying the identified sentence in the source language.

9. The method of claim 6 wherein more than one key word may be entered during the step of entering;
    the step of searching determining a coincidence and thus determining the address of the identified sentence only when every said key word is contained in said sentence.

10. The method of claim 6 wherein said step of displaying audibly speech synthesizes the target sentence.

* * * * *